July 8, 1952 W. K. DOW 2,602,235
PRECISION GAUGE
Filed Jan. 2, 1947 4 Sheets-Sheet 3
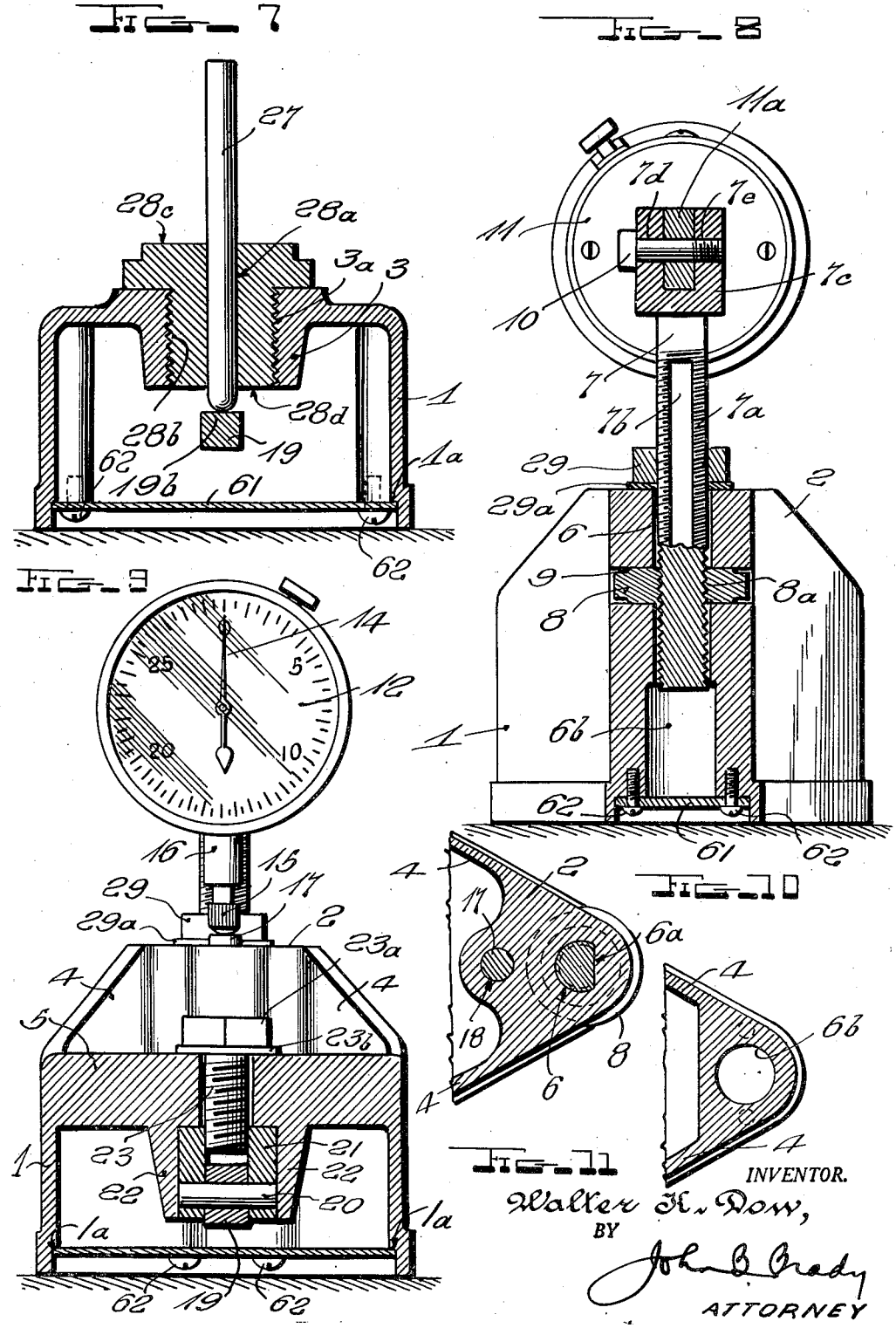
INVENTOR.
Walter K. Dow,
BY
John B. Grady
ATTORNEY

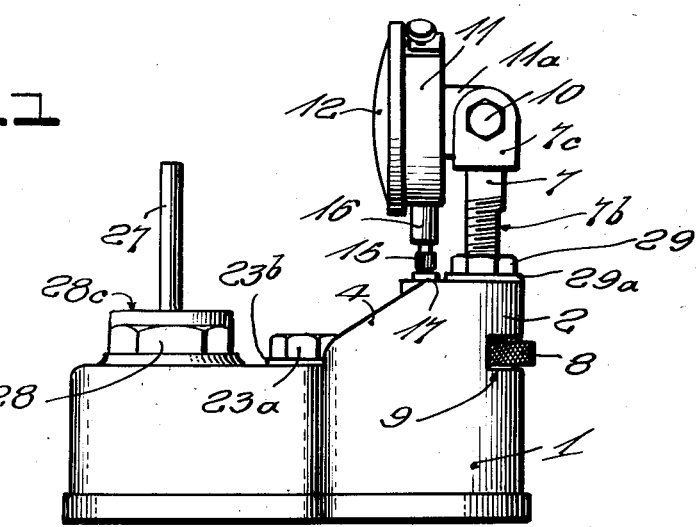

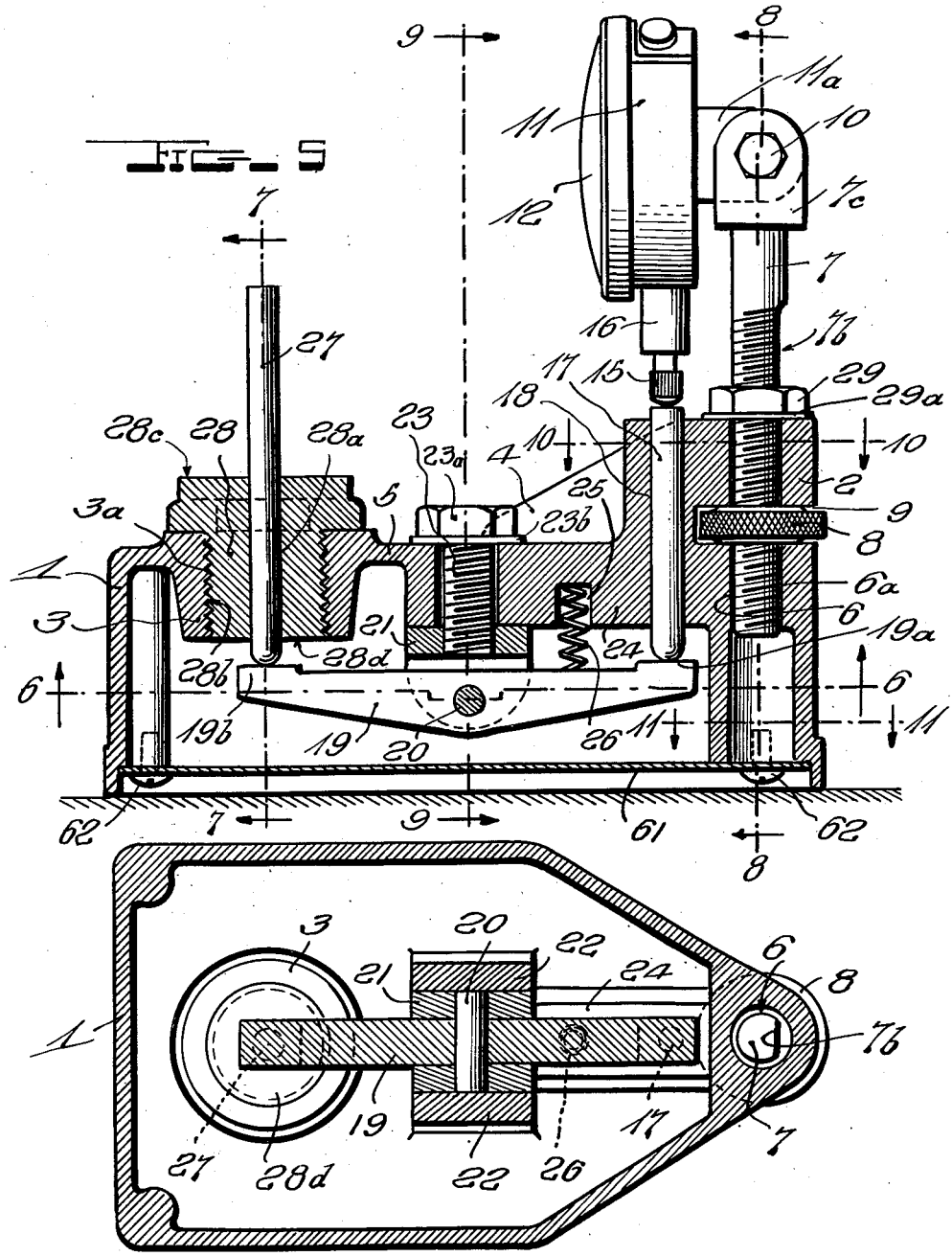

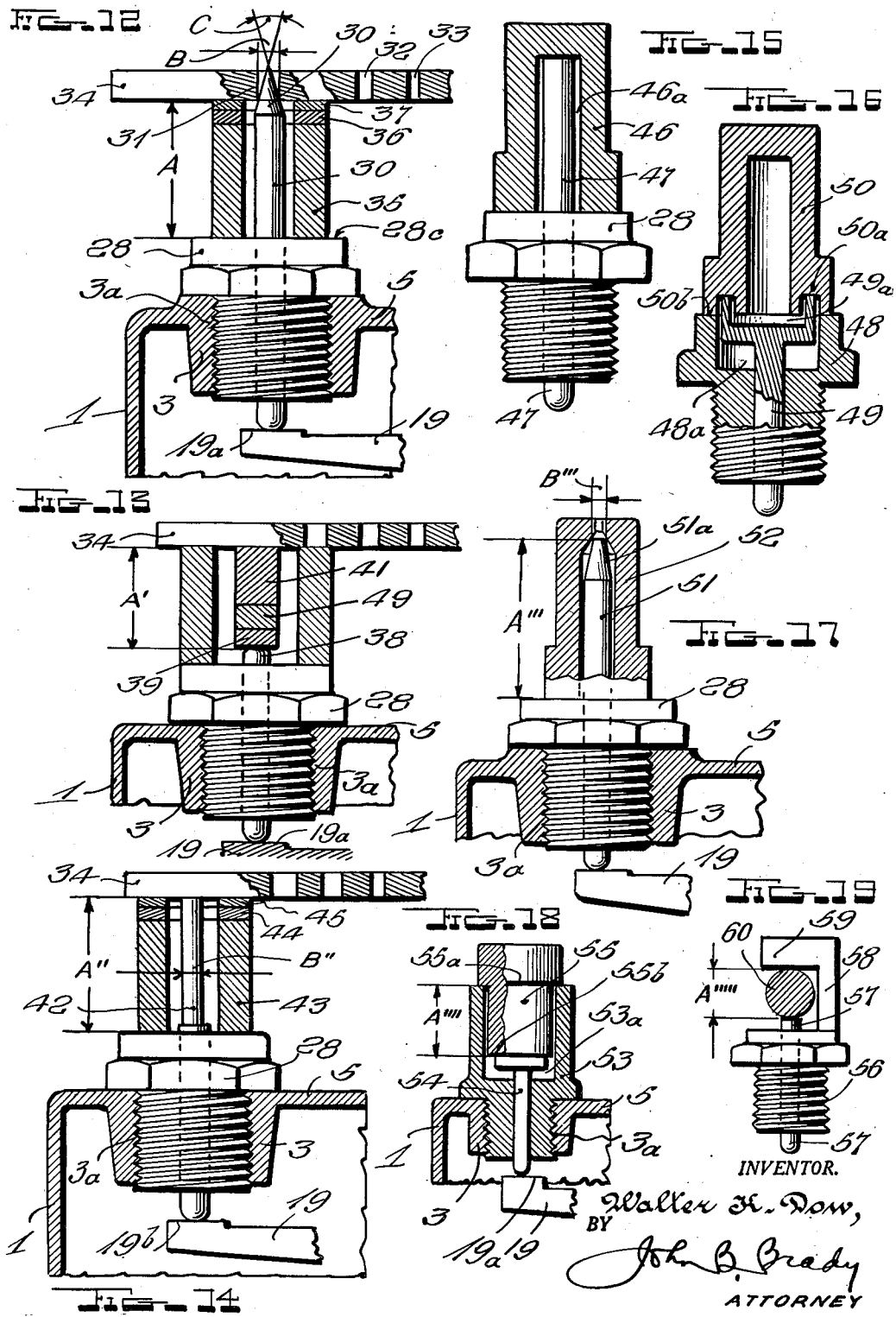

Patented July 8, 1952

2,602,235

UNITED STATES PATENT OFFICE 2,602,235

PRECISION GAUGE

Walter K. Dow, Longmeadow, Mass.

Application January 2, 1947, Serial No. 719,836

7 Claims. (Cl. 33—172)

My invention relates broadly to improvements in the gauging of internal lengths of manufactured, molded or formed parts and more particularly to a method of comparing dimensions of such parts to a master gauge or part using the inherent accuracy of a dial indicator.

One of the objects of my invention is to provide a precision type gauge of simplified construction for use in all types of manufacturing.

Another object of my invention is to provide an accurate means whereby the action of a standard type dial indicator held in a vertical plane, with the contact point down, is transferred to a downward action in a vertical plane several inches from the indicator.

Still another object of my invention is to provide a universal indicator gauge whereby various parts or dimensions on the same part may be checked by merely changing the gauge adapters or stages.

Another object of my invention is to provide a universal system of gauging internal lengths in parts so that economies in the manufacture of certain parts can be achieved by a recognized standard method.

A further object of my invention is to provide a gauge most suitable for internal gauging yet readily applicable to external lengths, diameters, flats or thread pitch diameters.

Another object of my invention is to provide a gauge in which approximately two-thirds of the original investment is entirely universal and can be used with many adapters for checking unrelated parts or dimensions.

Another object of my invention is to provide a very inexpensive highly accurate gauging means for internal dimensions.

Still a further object of my invention is to provide a gauging means whereby Johansson blocks may be used as the setting means for comparison to an internal length.

Another object of my invention is to provide a simple gauging means for checking the relative position of tapers to shoulders or faces of parts whether internal or external.

Another object of my invention is to establish by its use the very practical procedure of using masters for the control of dimensions in the manufacture of repetitive parts where the requirement calls for interchangeability.

Other and further objects of my invention reside in the improved construction of gauge as set forth more fully in the specification hereinafter following by reference to the accompanying drawing in which:

Figure 1 is a side elevational view of the gauge of my invention; Fig. 2 is a front view of the gauge shown in Fig. 1; Fig. 3 is a rear view of the gauge shown in Fig. 1; Fig. 4 is a top plan view of the gauge; Fig. 5 is an enlarged longitudinal sectional view through the gauge with certain of the parts illustrated in side elevation; Fig. 6 is a transverse sectional view looking upwardly through the base of the gauge, the view being taken substantially on line 6—6 of Fig. 5; Fig. 7 is a vertical sectional view through the gauge taken substantially on line 7—7 of Fig. 5; Fig. 8 is a vertical sectional view through the gauge taken substantially on line 8—8 of Fig. 5; Fig. 9 is a vertical sectional view taken substantially on line 9—9 of Fig. 5; Fig. 10 is a fragmentary horizontal sectional view taken substantially on line 10—10 of Fig. 5 and showing the vertically adjustable slidable support arranged in the base of the gauge for supporting the indicator; Fig. 11 is a fragmentary horizontal sectional view taken substantially on line 11—11 of Fig. 5; Fig. 12 is a fragmentary sectional view with certain of the parts illustrated in section and showing the application of the gauge of my invention to the measurement of the diameters of internal bores with the association of precision gauge blocks therewith; Fig. 13 illustrates another application of the gauge of my invention in the measurement of precision parts with the association of a taper gauge block and precision internal length blocks; Fig. 14 illustrates a further application of the gauge of my invention in the precision measurement of parts using associated precision gauge blocks; Fig. 15 illustrates an application of the gauge of my invention in the checking of the hole depth in a precision part in relation to the bottom face of the part; Fig. 16 illustrates the application of my invention in the measurement by use of a different adapter to check the depth of the bottom groove in a precision part in relation to the bottom face of the part; Fig. 17 shows in cross-sectional view the application of my invention in the measurement of internal lengths and diameters in precision parts; Fig. 18 illustrates the application of my invention for checking the outside length of a precision part from the shoulder to the bottom of the part; and Fig. 19 shows the application of my invention to a modified form of adapter for checking the external diameter of a precision part.

Referring to the drawings in detail reference character 1 designates the base support for the gauge of my invention having an elevated end portion 2 adjacent one end and a depending circular portion 3 disposed interiorly of the base adjacent the opposite end and internally screw-threaded at 3a. The elevated end 2 of the base support is connected by tapered side walls 4 with the substantially horizontally extending portion 5 of the base support. The elevated end 2 of the base 1 is provided with a vertically extending aperture 6 therein which, when viewed in section as shown for example in Fig. 10, is partially circular and terminates in a flat side 6a. The aperture 6 at the lower portion of the base is enlarged to a circular section as represented at 6b as shown more particularly in Fig. 11.

A support rod 7 having a screw-threaded shank 7a with a longitudinally extending flattened side 7b thereon extends into the vertically disposed aperture 6 and may be adjustably positioned therein by the knurled adjustment nut 8 which projects through a slot 9 formed in the end 2 of the base support 1. The knurled nut 8 is internally screw-threaded as represented at 8a to receive the screw threads 7a on the support 7. Support 7 may thus be adjusted vertically to various positions within the limits allowed by the depth of the circular section 6b of the aperture in the base 2. The upper extremity of the support 7 carries a yoke portion 7c which is transversely apertured at 7d and 7e to receive the screw-threaded securing bolt 10 screw-threaded on the end thereof to engage the corresponding screw threads in the aperture 7e in yoke 7c. The bolt 10 passes through the projecting portion 11a formed on casing 11 of the indicator. The indicator is represented at 12 as including a calibrated scale and a rotatable indicator hand 14 which is angularly movable thereover in accordance with the movement of the indicator actuator pin 15. The indicator actuator pin 15 extends downwardly through the protective sleeve 16 for presenting the indicator actuator pin 15 to the end of the vertically movable indicator pin 17. The vertically movable indicator pin 17 is disposed for slidable movement in the vertically arranged aperture 18 in base support 1. The indicator pin 17 serves as a force transfer member between the indicator actuator pin 15 and the end face 19a of the pivotally mounted lever 19.

The pivotally mounted lever 19 is carried by transverse pin 20 which is accurately journalled in bearings formed in the depending side portions of the U-shaped yoke 21. The U-shaped yoke 21 is fastened to the under side of the depending bifurcated portion 22 of the base 1 by means of the screw-threaded bolt 23. The screw-threaded bolt 23 engages screw threads in the U-shaped yoke 21 and is tightened by turning the head 23a from the top surface 5 of the base 1. The bolt head 23a is tightened against washer member 23b which abuts directly against the top surface 5 of the base 1. Thus lever 19 is fulcrumed about pin 20 as a pivot and is accurately secured in alignment with the longitudinal axis of the base 1 by the downwardly extending bifurcated portion 22 of the base 1. A longitudinally extending projection 24 is formed integrally with the under surface of base 1 intermediate the bifurcated portion 22 and the end of the base at 2. The projection 24 has a socket 25 formed therein for receiving the compression type coil spring 26 which tends to continuously urge lever 19 in a clockwise direction when viewed as shown in Fig. 5.

The opposite end of the lever 19 is provided with a face 19b which forms precision contact with the end of adapter pin 27. In the form of the invention illustrated in Figs. 1–11 the adapter pin 27 is vertically mounted for vertically slidable movement through aperture 28a in the adapter stage 28. The adapter stage 28 is externally screw-threaded at 28b to engage the internal screw threads 3a in the depending circular portion 3 adjacent the end of the base 1. The flat surface 28c of the adapter stage 28 forms a mounting means for various precision parts which are to be measured by the gauge of my invention.

It will be seen that any pressure applied against the end of adapter pin 27 is communicated directly to the face 19b of lever 19 which rocks about pivot 20 and moves adapter face 19a against the end of indicator pin 17 which directly abuts the end of the indicator actuator pin 15 for registering measurements by movement of indicator arm 14 over calibrated scale 12. The position of the indicator casing 11 above the end of the indicator pin 17 is controlled by movement of the knurled adjusting nut 8 to raise or lower support 7 by engagement of the internal screw threads of knurled nut 8 with the external screw threads 7a of the support 7. When the exact operating position is found lock nut 29 operating against washer member 29a is tightened to maintain the support 7 in the selected vertical position. Compression coil spring 26 tends to continuously urge lever 19 to a position in which face 19b thereof urges adapter pin 27 vertically upwardly. A limit of the clockwise movement is reached when the end 19b of lever 19 abuts the lower face 28d of the adapter stage 28.

For measurement of many precision parts the arrangement of adapter pin 27 projecting vertically from adapter stage 28 as illustrated in Figs. 1–11 may be employed.

For various applications of the precision gauge of my invention various adapters are applied to the gauge by removal of the adapter stage 28 and substitution of the special stage as required. As examples of some of these arrangements reference is made to Figs. 12–19.

In Fig. 12 I have shown the adapter pin 27 of the previous photographs of the drawings replaced by a gauge pin 30 having a conically shaped terminus 30a thereon adapted to enter various size bores 31, 32, 33, etc. of the taper gauge block 34 when supported by precision blocks represented at 35, 36 and 37 supported on the top surface 28c of the adapter stage 28. The indicator scale 12 may thus be calibrated and checked against known measurements for certain lengths A and certain diameters B for a predetermined taper C. Thereafter the gauge may be used in the measurement of bores of various diameters to be tested with the assurance of accurate calibration of the instrument.

In Fig. 13 I have shown the adapter pin 27 of Figs. 1–11 removed and substituted by the measurement pin 38 operative against the face 19a of the lever 19 and against the internal precision blocks 39, 40 and 41 arranged interiorly of the precision block 35 and associated with the taper gauge block 34. Internal length represented at A' may thus be accurately checked on the scale 12 of the indicator and thereafter internal lengths determined rapidly by application of the parts to be tested to the end of the measurement pin 38.

In Fig. 14 I have shown a further application of my invention to the testing of both the diameter and length of the precision part in which the gauge pin 42 is substituted for the adapter pin 27 heretofore explained where the gauge pin 42 has diameters of different sections, the upper section of which has a diameter B" which corresponds to the diameter B of the measurement pin illustrated at 30 in Fig. 12. Precision blocks are then selected to provide the length A" as represented at 43, 44 and 45. The flat end of the taper block 34 is then placed over the end of the gauge pin 42 and the indicator arm 14 adjusted to zero. This prevents any off taper condition from interfering with an accurate reading and fixes the contact line position accurately without regard to taper.

Fig. 15 shows the application of the gauge of my invention to the checking of the depth of hole 46a in the precision part 46. For this purpose a special measurement pin 47 is substituted in the adapter stage 28 in place of the pin 27 and the depth of the hole 46a directly read on the calibrated scale 12 of the indicator by applying the part 46 over the end of the measurement pin 47.

In Fig. 16 I have illustrated a still further application of the gauge of my invention wherein adapter stage 28 is replaced by a special adapter stage 48 having a cylindrical recess 48a therein operative to receive the measurement pin 49 in lieu of adapter pin 27. Measurement pin 49 has a shaped end thereon in the form of an annular rim 49a adapted to enter the groove 50a in precision part 50 for checking the depth of the bottom of the groove 50a in relation to the bottom face 50b of the precision part 50. The lower end of the measurement pin 49 is abutted by face 19a of operating lever 19.

In Fig. 17 I have shown the application of my invention to the precision checking of length and transverse dimensions of bores in precision parts. In this application measurement pin 51 is substituted for the adapter pin 27 in adapter stage 28. Pin 51 has a precision frusto-conical precision end portion 51a adapted to enter the internal bore of the precision part 52. The internal depth A''' is accurately measured by contact between measurement pin 51 and the end of the internal bore in precision part 52 and the diameter of bore B''' is determined by entry of the frusto-conically shaped end 51a of measurement pin 51 therein. I have successfully made measurements by this arrangement as accurate as one-ten-thousandth of an inch.

In Fig. 18 I have shown a different form of adapter stage applied to the gauge of my invention for performing special precision operations. An adapter stage 53 is substituted for the adapter stage 28 and is screw-threaded into the screw threads 3a of the annular screw-threaded depending portion 3. The adapter stage 53 extends upwardly and is provided with a cylindrical recess 53a therein below which there is arranged a headed measurement pin 54 which takes the place of the adapter pin 27. The headed measurement pin 54 provides a force transmission means from the precision part 55 to the face 19a of lever 19. The precision part 55 in this arrangement has an annular shoulder 55a which is adapted to rest upon the circular periphery of the adapter stage 53. A shank 55b extends downwardly from the shoulder 55a and the object of inserting the precision part 55 in the adapter stage 53 is to check the outside length of the shank 55b from the shoulder 55a, that is the distance A''''. The distance A'''' can be directly read on the calibrated scale 12 as each precision part is inserted in the recessed adapter stage 53 for depressing the headed measurement pin 53 which abuts against face 19a for actuating lever 19.

The external diameter of a precision part may be checked as illustrated in Fig. 19. In this arrangement an adapter stage 56 is substituted for adapter stage 28 and is provided with a measurement pin 57 therein which takes the place of adapter pin 27. The adapter stage 56 has at one side thereof an upwardly extending portion 58 terminating in a precision abutment face 59. The precision part which is to be checked as to diameter is represented at 60 and is introduced between the top of measurement pin 57 and the precision abutment face 59. Ejection of pin 57 toward face 19a of lever 19 results in an annular rocking of lever 19 about pivot 20 and a movement of indicator pin 17 for operating indicator actuator pin 15 and effecting a quick and direct reading of the annular position of indicator arm 14 on calibrated scale 12 thus giving an immediate reading of diameter of precision part 60 according to dimension A'''''.

The moving parts of the gauge are enclosed by a bottom plate 61 which rests against an internal peripheral shoulder 1a formed interiorly of casing 1 and is secured by screws 62 which enter screw-threaded recesses adjacent opposite ends of base 1.

While I have described my invention in one of its preferred embodiments I realize that modifications in detail may be made and I desire that it be understood that I intend no limitations upon my invention other than may be imposed by the scope of the appended claims.

What I claim as new and desire to secure by Letters Patent of the United States is as follows:

1. In a device of the character described, a base having an elevated portion having machined therein a flat sided, vertically directed aperture adjacent one end thereof, a flat sided and threaded indicator support rod in said aperture and held in vertical relation to the base by an adjusting ring and locked in adjusted position by a lock nut, and a dial indicator supported by said support rod, a second vertically directed opening adjacent said flat sided aperture, a threaded hole spaced from said aperture for receiving various and sundry gauge pins and adapters, a fulcrum means within said base and supported equally between the second opening and the threaded hole and a sliding pin in said second opening adapted to engage said fulcrum means and said dial indicator for accurately transmitting to said indicator movement of said fulcrum relative to the said hole but in the opposite direction, said lever engaging the end surfaces of said sliding pin and said gauge pin.

2. A gauge comprising a base having an opening in an elevated supporting portion adjacent one end thereof, an upright supporting rod in said opening in said elevated portion for supporting an indicator and holding it in a vertical position so that the operating point of said indicator contacts one end of a separate, unattached, vertical sliding pin located for sliding movement in an opening in said base and operable through a fulcrum lever in said base and which engages the opposite end of said pin for accurately transmitting to said indicator movement and in the opposite direction of said fulcrum lever relative to a position in the base in which is supported any one of a number of adapters and gauge pins designed for gauging specific parts or dimensions, said lever engaging the end surfaces of said sliding pin and said gauge pin.

3. A gauge comprising a base support, an adapter stage located adjacent one end of said base support and in fixed position relative thereto, an indicator supported adjacent the opposite end on an elevated portion of said base, an indicator actuator pin associated with said indicator, an indicator pin loosely mounted for free vertical sliding movement in said base in alignment with said indicator actuator pin and a lever pivotally mounted beneath said base and extending from said adapter stage at one end thereof to said indicator pin at the other end thereof and abutting the adjacent end of said pin for transmitting forces applied to said adapter stage to said indicator actuator pin, said lever engaging the end surface of said indicator actuator pin.

4. A gauge comprising a base support having a substantially hollow interior, a yoke secured substantially centrally of said hollow base and depending downwardly, a rockable lever journalled in said yoke, actuating faces on the upper ends of said lever, a removable adapter stage adjacent one end of said base and secured in fixed position relative thereto, a separate, axially slidable adapter pin extending through said adapter stage and having its end surface abutting the actuating face on the adjacent end of said rockable lever, a separate, axially slidable indicator pin slidably disposed through said base and having its end surface abutting with the actuating face on the other end of said rockable lever, an indicator, means for supporting said indicator adjacent the last mentioned end of said base, an indicator actuator pin projecting from said indicator having its end surface abutting with the adjacent end of said indicator pin and a compression coil spring interposed between said base and said rockable lever for urging said rockable lever into continuous engagement with said adapter pin whereby movement of said adapter pin is transmitted to said indicator actuator pin for operating said indicator.

5. A gauge comprising a base support having a substantially hollow interior, a yoke secured substantially centrally of said hollow base and depending downwardly, a rockable lever journalled in said yoke, actuating faces on the upper ends of said lever, an adapter stage adjacent one end of said base, an adapter pin extending through said adapter stage and having its end surface abutting the actuating face on the adjacent end of said rockable lever but not connected to said lever, an indicator pin slidably disposed through said base and having its end surface abutting with the actuating face on the other end of said rockable lever but not connected with said lever, an indicator, means for supporting said indicator adjacent the last mentioned end of said base, an indicator actuator pin projecting from said indicator into abutment with said indicator pin and means for adjusting the vertical position of said indicator above said base for selectively positioning said indicator actuator pin with respect to the upper end of said indicator pin whereby movement of said adapter pin is transmitted to said indicator actuator pin for operating said indicator.

6. A gauge comprising a base support having a substantially hollow interior, a yoke secured substantially centrally of said hollow base and depending downwardly, a rockable lever journalled in said yoke, actuating faces on the upper ends of said lever, an adapter stage adjacent one end of said base, a separate, axially slidable adapter pin extending through said adapter stage and having its end surface effecting pressure abutment with one of the actuating faces on the end of said rockable lever, a separate indicator pin axially slidably disposed through said base and having an end surface abutting with the actuating face on the other end of said rockable lever, an indicator, means for supporting said indicator adjacent the last mentioned end of said base, an indicator actuator pin projecting from said indicator and having an end surface in abutment with the end surface of said axially slidable indicator pin, said base being transversely slotted adjacent the last mentioned end thereof, said means for supporting said indicator comprising an axially adjustable adjusting screw extending through said base and through the slotted end thereof, an adjusting nut disposed in the slotted end of said base and engaging said adjusting screw, said adjusting nut projecting beyond the sides of said base and manually engageable for raising or lowering said adjusting screw and the indicator carried thereby for selectively positioning said indicator actuator pin with respect to the end of said indicator pin.

7. In a gauge, a base having a hollow central interior portion, a bifurcated member depending downwardly substantially centrally of said base, a yoke positioned within said bifurcated member, a lever pivotally mounted in said yoke and extending in opposite directions longitudinally of the hollow interior of said base, a removable adapter stage having an adapter pin carried by said base in fixed relation thereto in a position over one end of said lever, an indicator adjustably supported adjacent the other end of said base, an indicator actuator pin associated with said indicator and a slidable force transmitting member extending through said base between the opposite end of said lever and said indicator actuator pin whereby forces imparted to said adapter pin are directly transmitted to said indicator said member being separated from said lever and axially movable upon movement of said lever.

WALTER K. DOW.

REFERENCES CITED

The following references are of record in the file of this patent:

UNITED STATES PATENTS

| Number | Name | Date |
|---|---|---|
| 508,213 | Fortin | Nov. 7, 1893 |
| 1,290,434 | Walten | Jan. 7, 1919 |
| 1,647,552 | Tangring | Nov. 1, 1927 |
| 1,648,428 | Stacy | Nov. 8, 1927 |
| 1,660,986 | Berlowitz | Feb. 28, 1928 |
| 1,908,276 | Aldeborgh | May 9, 1933 |
| 2,016,659 | Tydeman | Oct. 8, 1935 |
| 2,210,560 | Allen et al. | Aug. 6, 1940 |

FOREIGN PATENTS

| Number | Country | Date |
|---|---|---|
| 591,332 | Germany | Jan. 19, 1934 |